Feb. 14, 1939.  E. F. ZAPARKA  2,147,360
AIRPLANE CONTROL APPARATUS
Original Filed Feb. 16, 1933   7 Sheets-Sheet 2

Inventor
EDWARD F. ZAPARKA
By Semmes & Semmes
Attorneys

Feb. 14, 1939. E. F. ZAPARKA 2,147,360
AIRPLANE CONTROL APPARATUS
Original Filed Feb. 16, 1933 7 Sheets-Sheet 3

Inventor
EDWARD F. ZAPARKA
By Semmes & Semmes
Attorneys

Feb. 14, 1939.  E. F. ZAPARKA  2,147,360
AIRPLANE CONTROL APPARATUS
Original Filed Feb. 16, 1933  7 Sheets-Sheet 4

Inventor
EDWARD F ZAPARKA
By
Semmes & Semmes
Attorney

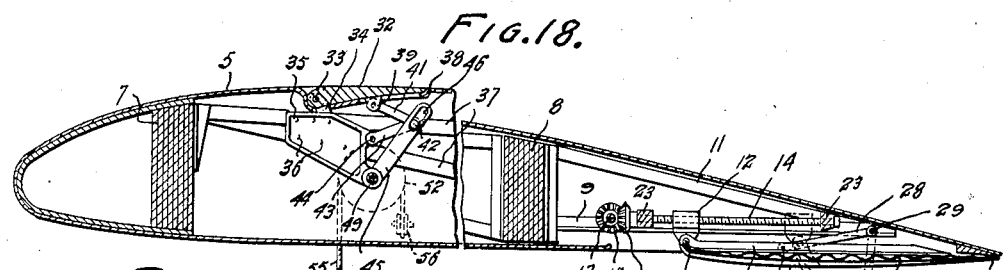

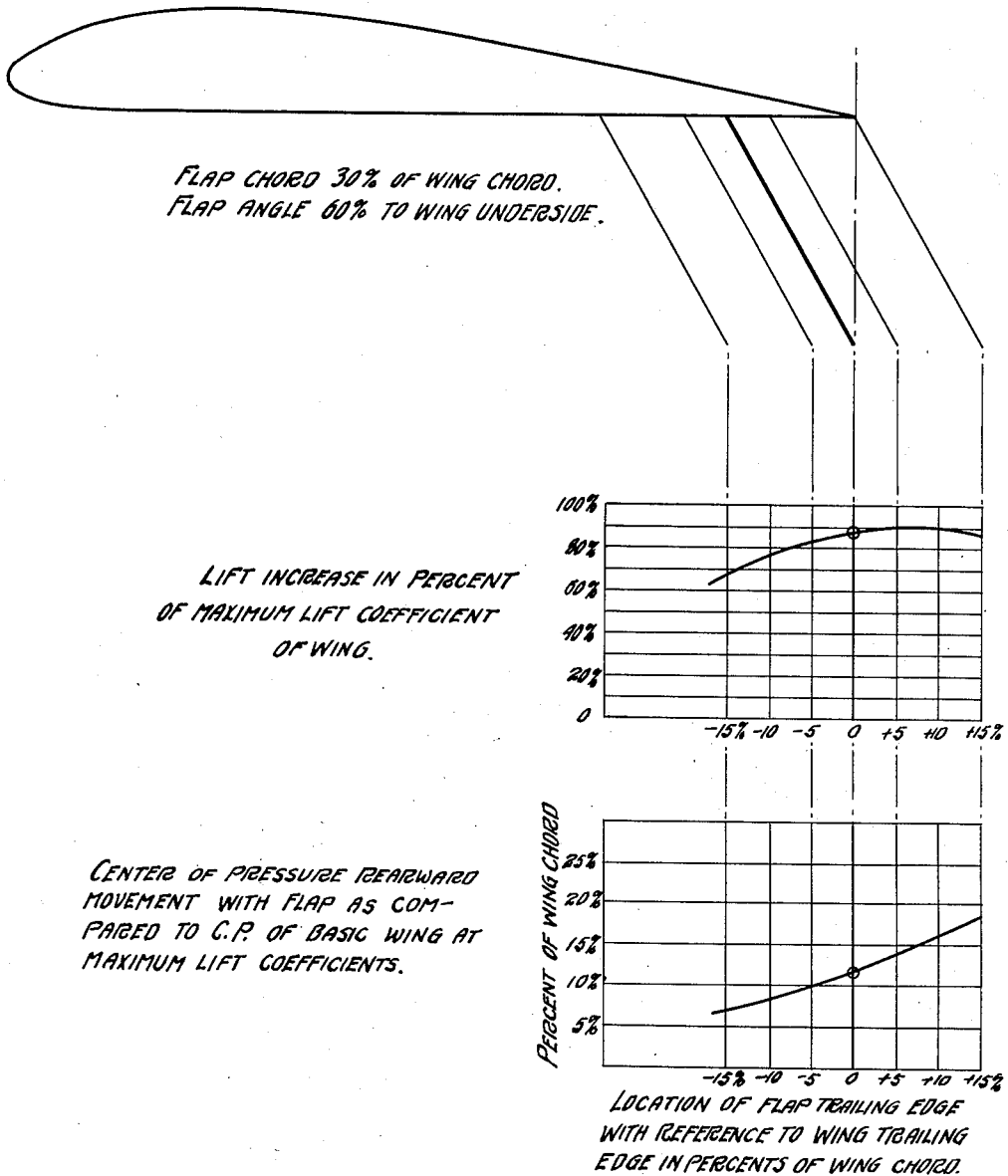

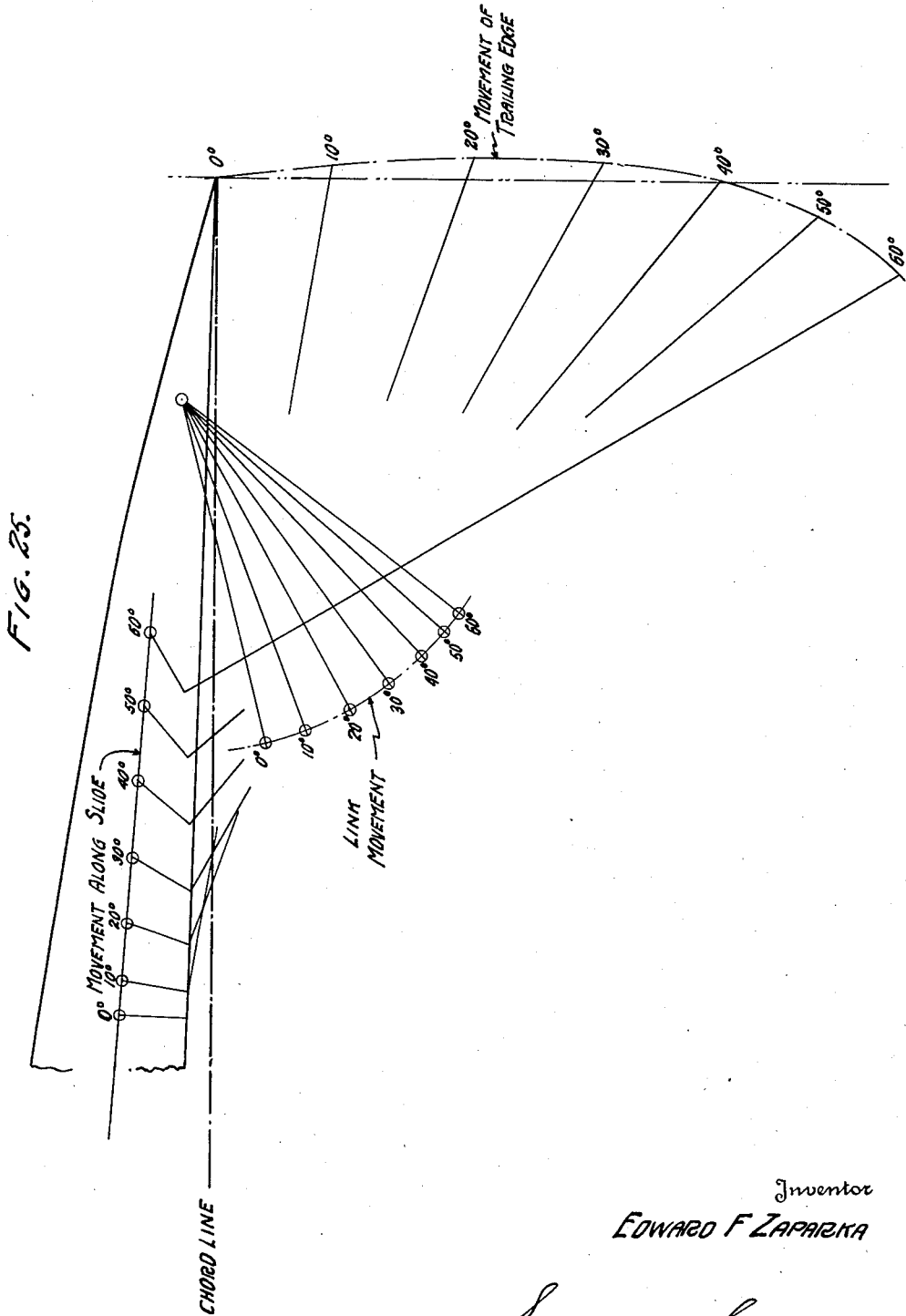

Patented Feb. 14, 1939

2,147,360

UNITED STATES PATENT OFFICE 2,147,360

AIRPLANE CONTROL APPARATUS

Edward F. Zaparka, Baltimore, Md., assignor to Zap Development Corporation, Baltimore, Md., a corporation of Delaware Application February 16, 1933, Serial No. 657,133
Renewed February 17, 1937

14 Claims. (Cl. 244—42)

My invention relates to aircraft construction, and in particular relates to the control of aircraft equipped with wing flaps which operate in the zone of optimum efficency.

Heretofore, where devices for increasing the lift and efficiency of wings were used, the reduction in speed with which the air flowed across the controlling surfaces had a deleterious effect upon the sensitivity of control, and the plane would tend to respond sluggishly to the controls. The greater the lift coefficient was increased, the more ineffective the controls became because of the resulting slow speed and other factors, and there was a danger of losing control of the plane, one of the very features which the increased efficiency in lift was designed to correct. Moreover, heretofore, the features of construction which accomplished increase in lift coefficient tended to produce air currents which in and of themselves, regardless of the decrease in air speed of the plane, tended to render ineffectual the controls.

An object of my invention is to greatly increase the lift coefficient of wing surfaces while maintaining great sensitivity of control of the plane.

Another object is to provide flexible and powerful control while retaining high stability and uniformity of performance at varying angles of attack.

Another object of the invention is to permit slow flying of a plane while providing powerful control action at greatly reduced speeds.

A further object of the invention is to cause the operation of the system which reduces the flying speed to augment the action of the control surfaces by its correlation thereto.

Still another object of the invention is to provide sensitivity of control of a plane equipped with wing flaps arranged for operation in the zone of optimum efficency.

A still further object of the invention is to increase the effective action of spoilers by increasing the flow over the spoiler surfaces while at the same time increasing the lift coefficient of the wings.

Yet another object of the invention is to increase the favorable yawing moment produced by spoilers while greatly increasing the lift coefficient of the wings.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which, for the purpose of explanation, have been made the subject of illustration.

Referring to the drawings:

Fig. 18 is a cross sectional view of a wing broken in the middle, showing the location of the parts for operating the spoiler and the flap, the spoiler being shown in its retracted position;

Fig. 19 is a detail showing the operation of the spoiler in its raised position;

Fig. 20 is a view showing the details of the operating mechanism for the spoiler, part of the view being taken on the line 20—20 of Fig. 19;

Fig. 21 is a fragmental perspective view showing the operating mechanism for the spoilers and the wing flaps;

Fig. 22 is a diagrammatic illustration showing the desirable position of the trailing edge of the extensible flap with respect to the trailing edge of the wing section plotted in relation to the datum line for a wing having a flat lower surface.

Fig. 23 is a similar view showing the position of the trailing edge of the flap for a wing having a curved lower surface;

Fig. 24 is the combination of a diagrammatic illustration of various flap positions, together with graphs showing the lift co-efficient for these positions and the variations in center of pressure, the graphs being plotted for the maximum lift of the wing with the flap and with reference to the maximum lift coefficient of the wing without the flap.

Fig. 25 is a diagrammatic view showing the positions of the trailing edge of the wing flap when using the type of wing flap control mechanism shown in the drawings.

Fig. 26 is a diagrammatic illustration showing the desirable position of the trailing edge of the extensible flap with respect to the trailing edge of the wing section plotted in relation to the datum line for a double cambered wing.

Figure 1:
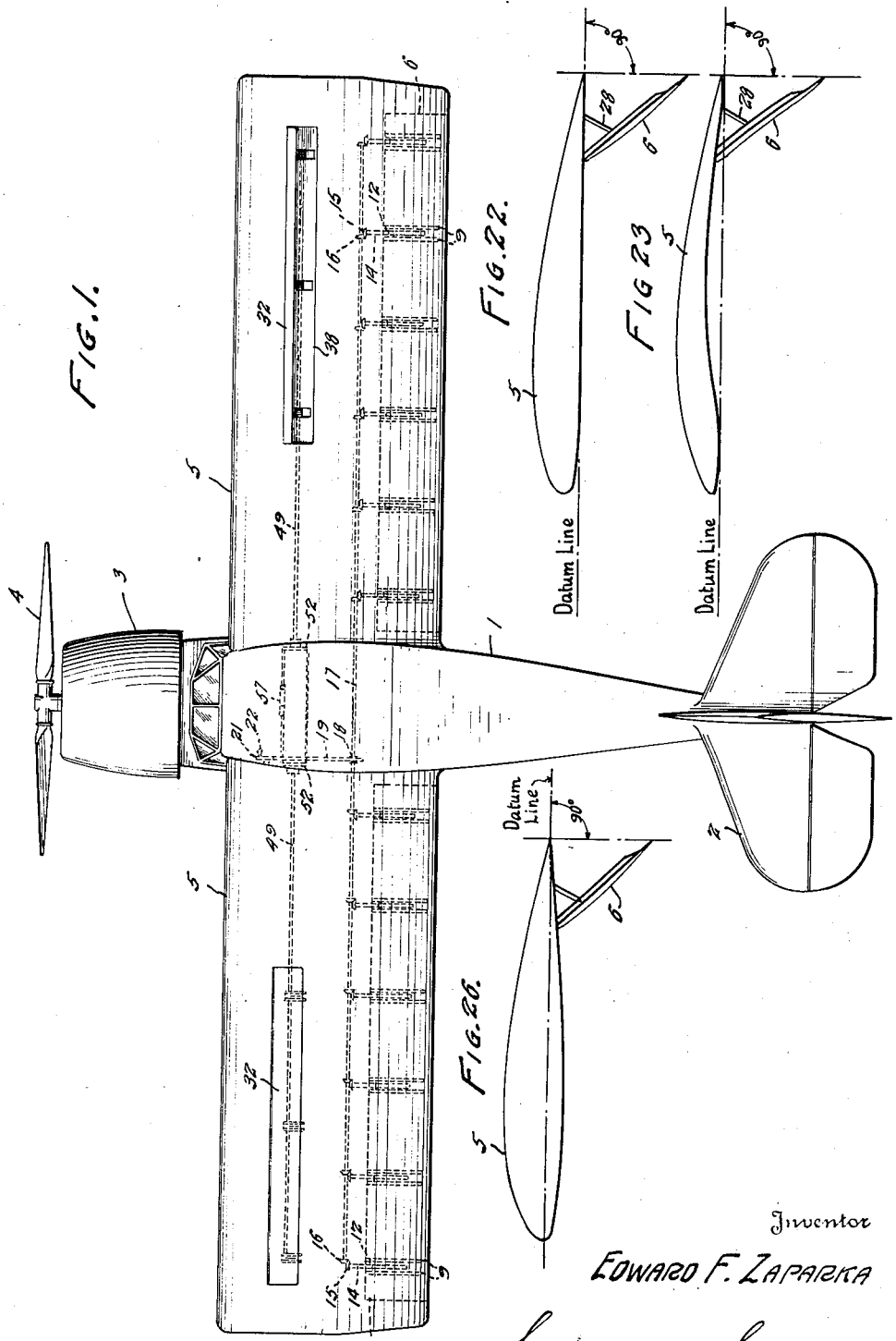
Figure 1 is a top plan view of an airplane showing in dotted lines the mechanism for operating the wing flap and for operating spoilers located on the top surface of the air foil at approximately the position of the maximum ordinate.

My invention is in part a continuation of my copending applications Serial No. 587,570, filed January 19, 1932 and Serial No. 627,859, filed August 8, 1932.

In my invention I combine with a flap whose trailing edge is in all positions substantially directly below the trailing edge of the wing of the plane, spoilers and other forms of device for the control of the plane. By the term "directly below", I mean that the trailing edge of the flap shall lie substantially within a locus of lines passing through the trailing edge of the wing and perpendicular to the datum line of the wing section. As the flap is lowered, its trailing edge is lowered, but its trailing edge always stays approximately within this locus of lines which is perpendicular to the datum line of the wing section and passes through the trailing edge of the wing. This feature of my construction is of the greatest importance since a flap so constructed operates within the zone of optimum efficiency.

The above description is intended to take care of a wing which may have a curved lower surface, as some of them do. Another way to define the location of the flap and its operation is to say that the trailing edge of the flap must lie, either while being retracted or in any of its extended positions, within the perpendicular to the projected chord of the wing. All of this has no relation at all to the position of the air foil in the air, but I am definitely referring to the projection of the wing when it is looked upon in its position of greatest area, and to the chord referring to that projection.

In order to illustrate the ideal position of the trailing edge of the wing flap with respect to the wing section, I refer to Figure 22 which shows a wing section having a flat lower surface. The datum line is shown and a line perpendicular to the datum line passing through the trailing edge of the wing. It is to be noted that the flap, which is shown in the extended position has its trailing edge lying within the line drawn perpendicular to the datum line and passing through the trailing edge of the wing.

In Figure 23 is shown the ideal location of the flap for a wing having a curved lower surface. The datum line is indicated and a line perpendicular to the datum line passing through the trailing edge of the wing is indicated. It is to be noted that the trailing edge of the flap, which is shown extended, terminates in this line drawn perpendicular to the datum line and passing through the trailing edge of the wing.

A similar view for a double cambered wing is shown in Fig. 26. Here again the trailing edge of the flap is shown touching the perpendicular to the datum line drawn through the trailing edge of the wing section.

Figs. 22, 23 and 24 show the theoretical ideal which must of necessity be approximated in practice.

Referring to Figure 24, I have diagrammatically illustrated a wing section with various positions of the flap, the indications of the position of the trailing edge of the flap being in percentages of the total wing chord. Those positions forward of the position in which the trailing edge of the flap lies within the locus of perpendiculars to the wing chords and passing through the trailing edge of the wing are indicated as minus per cent, and those positions of the trailing edge of the flap which lie behind the defined locus are indicated as plus per cent.

The data here presented concerning lift coefficient change and center of pressure change is predicated on the N. A. C. A. report Number 422 of May 1932.

It is to be noted from the graphs that there is an increase in lift coefficient for the flap in the location in which the trailing edge of the flap lies fifteen per cent of the wing chord forward of the defined locus. There is a falling off of the lift coefficient in accordance with the curve shown at positions of the trailing edge of the flap forward of the minus fifteen position. This curve does not show the entire range. Theoretically, at the position of the trailing edge of the wing flap at minus fifty per cent, there would be no increase in lift coefficient, and only an increase in drag.

At minus fifteen per cent, the position of the wing being such as to give the maximum lift, there is an increase in lift coefficient of approximately sixty-seven per cent. At the minus ten per cent position there is an increase in lift of approximately seventy-six per cent; at the minus five per cent position an increase of approximately eighty-three per cent. At the zero position of the graph, which is the one in which the trailing edge of the flap lies within the defined locus, there is an increase in lift coefficient of approximately eighty-eight per cent. At the plus five position for the trailing edge of the flap, there is an increase of approximately ninty-one per cent; at the plus ten position an increase of approximately ninety per cent; at the plus fifteen per cent there is an increase of approximately eighty-seven per cent.

Now let us turn to the lowermost graph which shows the movement of the center pressure rearward for the various positions of the flap compared to the center of pressure of the basic wing at the maximum lift coefficient. At the minus fifteen position for the trailing edge of the flap the center of pressure moves rearward seven per cent of the length of the wing from the position of the center of pressure for the basic wing. At the minus ten position the center of pressure moves rearward approximately eight per cent. At the minus five position for the trailing edge of the flap the center of pressure moves rearward approximately ten per cent from the basic position. At the zero position of the trailing edge of the flap, when the trailing edge lies within the defined locus, the center of pressure lies approximately twelve percent rearwardly. At the plus five position for the trailing edge of the flap the center of pressure has moved rearwardly approximately thirteen per cent; at the plus ten per cent position the center of pressure has moved rearwardly approximately fifteen and one-half per cent. At the plus fifteen position for the trailing edge of the flap we have the center of pressure at approximately seventeen and one-half per cent rearward of the center of pressure for the basic wing at its maximum lift coefficient.

It will be seen that with the trailing edge of the flap in the zero position, we have a high lift coefficient; one which is very near the maximum. It will be noted that with the movement of the flap backward to the plus five position, we have a very slight increase in lift coefficient, but a considerable change in the center of pressure. The increase in the lift coefficient would not offset the complications due to necessary increase of weight arising from the rearward movement of the center of pressure. Between the minus 5 and the zero position there is a smaller movement of center of pressure rearward, which is more than compensated by the increase of lift coefficient between these two positions. If we move the flap from the zero position to the plus five position, the gain in lift coefficient is lesser and the movement of the center of pressure is of larger value as compared to the change in these factors when we move the flap from the minus five to the zero position.

The position of the flap in which its trailing edge lies approximately within the defined locus I define as the position of optimum efficiency.

Referring to the drawings, Figure 25, which is merely illustrative of one type of flap which embodies my invention, there is shown plotted geometrically the varying angles of a wing flap in its extended position, and the position of the trailing edge of the wing flap in relation to the perpendicular through the wing chord which passes through the trailing edge of the wing. The design of the operating mechanism for the flap in this illustration was similar to but not identical with that of the flap whose operating mechanism I have described in detail in this specification. It is to be noted that with the design set forth in this application in detail, and also the design of Fig. 25, it is impossible to keep the trailing edge in all positions exactly within the desired locus, but the approximation is sufficiently close to give the desired operative characteristics which have been fully explained. In Figures 22, 23 and 26 there is an ideal diagrammatic showing. This Figure 25 shows what may be expected in practice. Certain control linkages may cause the trailing edge of the wing flap to lie in its extended positions closer to the desired locus. Under other conditions of construction the variation from the ideal would be greater than that shown in Figure 25. Figure 25 geometrically shows actual conditions in a machine which I have made and tested. In this particular machine there was a slightly greater slope downward toward the trailing edge of the slides or tracks on which the carrier blocks for the flaps slide than is indicated in Fig. 18, which figure will be later explained in detail.

Another feature of prime importance in connection with my wing flap is that the operating mechanism for the flap is in general largely nested within the wing section and parasitic resistance is thereby almost entirely eliminated. The only part which projects from the wing section with the flap in the extended position, in the particular form shown in detail in the drawings, is an arm member located in the rear of the flap. In my normal construction there is usually no part of the flap operating or supporting means which projects into the air stream to an objectionable extent. Heretofore, by reason of the large external bracing and support members necessary with flaps heretofore devised, considerable parasitic resistance, and hence loss in efficiency, was common. Moreover, these sizable bracing and support members externally located on the wing tended to interfere with any proper operation of the flap itself, and at the same time, in many instances, reacted unfavorably on the controls of the craft.

Throughout this specification when I speak of a flap in connection with any of the forms of device shown, I intend to use the flap which I have invented and whose operative characteristics are such that its trailing edge in all extended positions shall lie approximately within the locus of lines perpendicular to the datum lines of the wing sections and passing through the trailing edge of the wing. It is to be understood, of course, that I am to be allowed some range of equivalents to take care of constructions which only approximate the theoretically perfect by reason of factors of plane construction which forbid the absolute theoretical maximum efficiency to be obtained. In the constructions shown, however, I am aiming at this theoretically perfect position of the flap and aim to approximate it within limits of tolerance imposed by the exigencies of manufacture and the purposes for which the plane is designed.

Referring to the drawings, and particularly to Figs. 1, 2, 18, 19, 20 and 21, I have shown a plane construction employing the type of flap which I have just described, together with simple control mechanism for its operation. This construction of flap is combined with a spoiler construction located at the position of the maximum ordinate of the wing section and on the upper edge thereof. The drawings show a plane having a fuselage 1, rear control surfaces comprising a rudder, elevators and a stabilizer, which I have generally designated by 2, a motor 3, a propeller 4, and wing sections 5 of similar construction. The particular plane shown is a monoplane, though other types of planes can embody the inventive features illustrated. Each of the wing sections is provided with a wing flap 6 so constructed that its trailing edge in all the extended positions lies approximately within the locus of perpendiculars to the datum line of the wing sections and passing through the trailing edge of the wing.

Referring to Figs. 1, 18 and 21 particularly, it will be seen that the wing 5 is provided with a front spar 7 and a rear spar 8. There are parallel track or slide members 9 which are suitably spaced from each other, as shown in dotted lines in Fig. 1, and are suitably attached, by any proper means, to the interior of the wing 5, such as by bolting, riveting, welding or otherwise, to the interior of the wing or bracing members, such as the rear spar 8 and bracing members 11. Adapted to slide on these track members or slides are carrier blocks 12 having grooves 13 therein into which fit the parallel track members. The carrier blocks 12 are screw-threaded onto rods 14 which are provided with beveled gears 15 at their ends.

The beveled gears 15 mesh with beveled gears 16 carried on a rod 17. The rod 17 is adapted to be rotated through a sprocket wheel 18 mounted on the rod over which passes a flexible chain member 19. The chain member 19 passes over another sprocket wheel 21 which is manually operated by a handle 22 located in the cockpit.

The rod 17 is suitably supported in the interior of the wing for rotation in a manner not shown. The rods 14 may be journaled in support members 23, illustrated in cross section in Fig. 18.

As may be readily understood, upon rotation of the handle 22 through sprocket gear 21, chain 19 and sprocket gear 18, rod 17 is rotated, rotating beveled gears 16. The rotation of the beveled gears 16 rotates beveled gears 15, causing the rods 14 to rotate to move the carrier blocks 12 along the screw-threaded portion of rods 14. The carrier blocks 12 operate the flap constructions, causing the flap in its upper position to be nested, as shown in Figure 18, within the confines of the outline of the wing section, or to be extended, as indicated in dotted lines in Figure 18.

Pivoted to the underside of the carrier blocks 12 are metallic bracing members of angular construction 24. These bracing members 24 are suitably attached to the upper side of the flap, which is shown as comprising a corrugated metallic member 25. The lower side of the flap is constructed with a smooth metallic surface 26. The corrugated upper member 25 gives added strength to the construction which, together with the bracing members 24 which, as diagrammatically shown in Figure 1 would be located at spaced points along the flap, gives a very strong construction able to withstand strains imposed thereon. The point of attachment of the bracing members 24 to the carrier blocks 12 comprises a pivot 27 so that the flap construction can pivot freely on the bottom of the carrier blocks 12.

The only other point of attachment of the flap members 6 to the plane is through links 28. The links 28 may be suitably pivotally attached at one end 29 to some of the interior construction of the wing; for instance the pivot 29 may be journaled in the track members 9, though this construction is not obligatory. The link members are pivoted at their other end at 31 to the bracing members 24. The length of linkage and the position of the pivots is such that when the carrier block 12 is moved rearwardly, as indicated in dotted lines in Figure 18, the tip of the trailing edge of the flap shall lie, in all positions of extension or retraction of the flap, substantially in the locus of lines drawn through the trailing edge of the wing and perpendicular to the datum lines of the wing sections.

By operating the handle 22 through the mechanism described, the carrier block 12 is screwed either forwardly or rearwardly on the rod 14. In the foremost position on the block 12, the flap is withdrawn, as shown in full lines in Figure 18. In the rearmost position, indicated in dotted lines in Figure 18, the flap 6 is fully extended.

The construction and operation has been described for one flap. As indicated in Figure 1, there are two flaps 6, each of which is operated in the same manner. In Figure 21 a construction for the dual and simultaneous operation of the flaps is readily apparent.

In the form of the invention shown in Figures 1, 2, 18, 19, 20 and 21, there are shown two spoilers 32 which are located on the top of a wing and pivoted at approximately the position of the maximum ordinate of the wing section.

In Figure 1, looking down on the top of the plane and facing the propeller, the right hand spoiler is shown in the raised position, the left hand spoiler being in the closed position, nested approximately flush with the upper surface of the wing. The nested position of the spoiler is indicated in Figure 18. The spoilers are pivoted at 33 on upwardly projecting arms 34 carried by bracing members 35 which in turn are bolted or riveted, as illustrated at 36, to interior brace members 37 within the body of the wing. The spoiler 32 is so constructed as to fit within a recess 38 in the upper surface of the wing so that in the down position of the spoiler, as indicated in Figure 18, the spoiler is nested in the depression 38 in the wing and will not disturb the air currents passing over the wing. The spoilers are provided with ears 39 to which are pivoted link members 41. The link members 41 comprise part of toggle arrangements whose other ends are pivoted, as at 42, to other toggle members 43. The toggle members 43 are pivoted at their ends opposite their points of pivoting to the toggle members 41, at 44 to the brace members 35.

In Figure 19 I have shown a spoiler which may be of hollow construction. It is to be understood that these illustrations are merely diagrammatic and the details of exact construction of the spoiler bodies themselves shall conform to known practice.

In order to operate the toggle construction to raise and lower the spoilers 32, I have shown operating arms 45 controlled by a suitable mechanism, later to be described, to raise the arms 45 in their upright position, as shown in Figure 19, or their lower position, as shown in Figure 18. The arms 45 are provided with slots 46 at their upper end, into which slots are adapted to slide the pivot members 42 which permit the toggle arms 41 to pivot on toggle arms 43. Surrounding the pivot members 42, as shown in detail in Figure 20, are bushings or rollers 47 provided with heads 48 which provide anti-friction contact between the interior of the slots 46 and the pivots 42, linking the toggle arms 41 and 43.

The operating arms 45 are mounted at their lower end on an operating shaft 49 to which they are keyed, as indicated at points 51. The operating shaft 49 is journaled in the member 35, and the two operating arms are rotated with the operating shaft 49 to operate through rolling contact with bushings or roller members 47 to move the pivots 42 to extend the toggle connections comprising the arms 41 and 43, as shown in Figure 19, or retract them, as shown in Figure 18. When the toggle arms are in the position shown in Figure 19, the spoiler is raised; when they are in the position illustrated in Figure 18, they are shown lowered.

The operating shaft 49 can be manually operated by the pilot to raise or lower the spoilers through mechanism which is illustrated particularly in Figures 20 and 21. Mounted on the operating shaft 49 is a pulley wheel 52 which is keyed, by means of a key member 53, to the operating shaft 49. Lost motion connection is provided, however, through a slot 54. Passing over the pulley 52 is a flexible cable 55 which passes over idler pulleys 56, and over a corresponding pulley 52 located for controlling the spoiler on the opposite wing. The construction of the control for the opposite spoiler is identical with that just described, except that the lost motion connection is provided to operate in the opposite direction. This will be readily apparent from an inspection of the position of the pins 53 in the slots 54. As shown in detail in Figures 20 and 21, the cable 55, as stated, passes over the idler pulleys 56 and is adapted to be moved in either direction, as indicated by the arrows.

The operating mechanism consists of a pivoted control stick 57 to which the cable is attached at its lower end. On movement of the stick 57 in the position shown in Fig. 21, the cable has been caused to move in the direction of the arrows to cause one pulley 52 to be rotated in the indicated direction to raise the spoiler on the left wing.

In operation let us assume that the stick 57 is in its upright position. Let us assume then that it is moved to the position shown in Fig. 21, causing the cable 55 to move as indicated in the arrows. This will rotate the pulley 52 on the left in the direction of the arrows, which will cause the operating shaft 49 to rotate, moving with it the operating arms 45, and raising the spoiler into the position shown in Fig. 21 and Fig. 19, through the linkage previously described. By reason of the lost motion mechanism between the operating shafts 49 and the pulleys 52, the rotation of the pulley 52 on the right hand side of Figure 21 has merely caused the pin 53 to slide in its slot 54, and the spoiler 32 on that side of the wing is not moved at all but remains in its nested position.

Let us assume that the control stick 57 is moved beyond the perpendicular position and to the right from the position shown in Figure 21. The spoiler on the left hand side, as shown in Figure 21, will be lowered, and there will be approximately an upright position of the control stick 57 when both spoilers are down. On further movement of the control stick 57 to the right, the spoiler on the right wing in the view shown in Figure 21 will be raised, and the spoiler on the left wing remains in its lower and nested position.

In normal flight both spoilers will be down, but when it is desired to make a turn, the control stick 57 is operated to raise one of the spoilers to a desired degree.

The spoiler in a raised position operates to decrease the efficiency of the wing upon which it is raised since it disturbs the air currents passing along the upper surface of the wing and the lifting forces exerted by the upper surface are greatly decreased.

Moreover, the spoiler, when it is near its position of full operativeness, exerts a favorable yawing moment on the plane. For instance, let us suppose that the spoiler on the left wing of the construction diagrammatically illustrated in Figure 21 is raised. That wing loses lift. The spoiler, moreover exerts a drag on that wing. The combination of these forces produces a lowering of the left wing and a retarding of the left wing which tends to bank the machine, and the yaw produced by the drag tends to make the machine take the turn.

The wing upon which the spoiler is raised, for instance, the left hand wing in the illustration in Fig. 21, or the right hand wing in Fig. 1, loses its lifting efficiency because the current of air passing over the upper surface of the wing is deflected upwardly and the smooth flow destroyed. The lifting action of the upper surface of the wing is decreased in proportion to the amount that the spoiler is raised up to a certain maximum.

The use of the spoiler with the flap construction described produces unexpectedly excellent results in control. This is, I believe, accomplished by reason of the fact that in the passage of a wing surface through the air there is produced at the lower surface a layer of air which is at higher pressure than the atmosphere. Likewise, and conversely, on the upper surface there is a layer which is at lower pressure than the atmosphere and therefore rarefied. In ordinary plane constructions there is a tendency for the layer on the lower surface to creep over the trailing edge of the wing and neutralize the layer on the upper surface, thus decreasing the circulation of the air over the upper wing and decreasing the lifting effect of the upper wing.

Where spoiler control is used, the efficiency of the spoiler depends upon the flow of air over the wing surface, and my flap which operates within the zone of optimum efficiency greatly increases the flow of air over the upper wing surface over that ordinarily existing in a normal wing construction. This increased circulation of air gives an increased effect, and greatly augments the forces of control brought into play by the operation of the spoilers. Where the specified flap construction is used there is a layer of air along the lower surface but this layer of air passes off the tip of the flap and only neutralizes with the layer of air on the upper surface, which is the rarefied layer, at some point well in the rear of the wing surfaces. There is no chance for the layer of the lower surface to creep up over the upper surface, destroying the free flow of air over the upper surface. With the specified flap construction, therefore, the free flow of air over the upper surface is greatly increased and the effectiveness of spoiler control is greatly enhanced.

This is of extreme importance since the increase in the lift coefficient of the wing permits flight at greatly reduced air speeds, which reduced speeds would tend to render ineffective lateral control of the ship.

It will thus be seen that I have a combination which produces more excellent results, greater flexibility and efficiency of control than has heretofore been achieved, while at the same time solving the problem of powerful and sensitive control at slow speeds.

Figure 2:
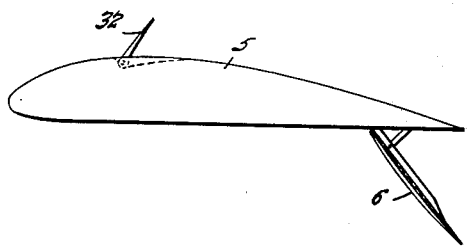
Fig. 2 is a diagrammatic illustration in side elevation of a wing section showing the spoiler and flap in effective position in the construction shown in Fig. 1.

Having now described in some detail the operation and construction of my flap which operates in the zone of optimum efficiency, and the control mechanism for the spoiler of Figure 2, attention is now called to the various other forms of construction which I have illustrated in a more diagrammatic fashion.

Figure 3:
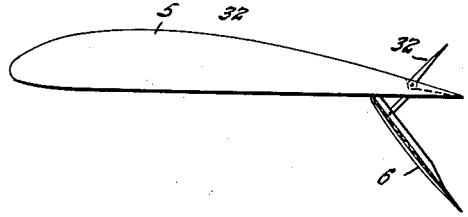
Fig. 3 is a diagrammatic illustration showing a spoiler located on the top surface of the trailing edge of the wing, the spoiler and flap being in the effective position.
Figure 4:
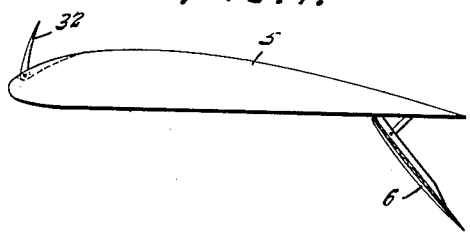
Fig. 4 is a diagrammatic illustration showing a spoiler located at the nose of the wing on the top surface thereof, the spoiler and flap being in the effective position.

In Figure 3 I have shown spoilers located on the top surface near the trailing edge of the wing. This form of spoiler is extremely efficient by reason of the fact that the spoiler itself tends to prevent mixture of the layers above referred to. In Figure 4 I have shown a spoiler located near the nose on the upper surface of the wing. The spoiler located in the position shown in Figure 4 tends to spoil the lifting effect of a large area of the upper wing surface.

Figure 5:
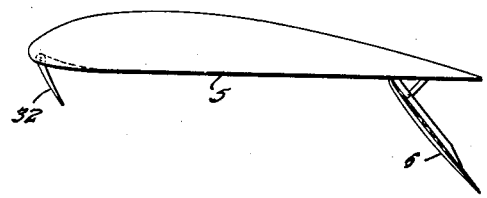
Fig. 5 is a diagrammatic view of a modification showing a spoiler in effective position located on the nose at the under side of the wing, the spoiler and the flap both being extended.
Figure 6:
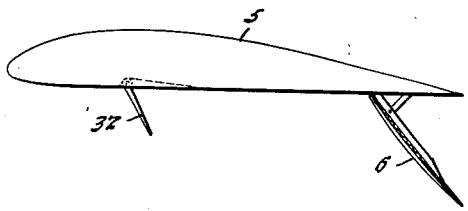
Fig. 6 is a modification diagrammatically showing a spoiler located on the under side of the wing at approximately the position of the maximum ordinate; both spoiler and flap being in extended position.

Respecting the forms shown in Figures 5 and 6, with the spoiler located at the under side near the nose of the wing section, the spoiler operates to increase the air flow, and hence to decrease the effect of the wing flap which in itself decreases the air flow over the lower surface. Since decrease in air flow over the lower surface as normally accomplished by the flap increases the lift, the spoiler has appreciable effect on the increase in lift. The increase of air flow due to the spoiler located near the nose, spoils in part the effect of the flap and lowers the lift of the flap construction, thereby lowering the wing at the same time the spoiler exerts the favorable yawing moment mentioned in connection with the forms of spoiler located on the upper wing surface.

In Figure 5 the location of the spoiler at the nose of the lower wing is probably at the optimum position. In Figure 6 where the spoiler is located somewhat rearwardly, its effect in overcoming the favorable lift exerted by the flap is somewhat lessened.

Figure 7:
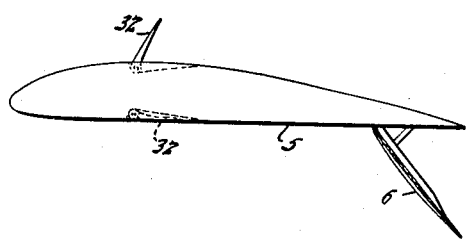
Fig. 7 is a modification diagrammatically showing a spoiler located in effective position at approximately the position of the maximum ordinate and on the upper surface of the wing, as well as a spoiler on the opposite lower surface of the wing, the lower spoiler being shown in inoperative position.

In Fig. 7 I have shown a form in which the spoilers can be raised either on the upper or lower surface of the wing either simultaneously or separately, in which case the advantages of both forms of spoiler in cooperation with the flap as previously set forth, will be apparent.

Figure 8:
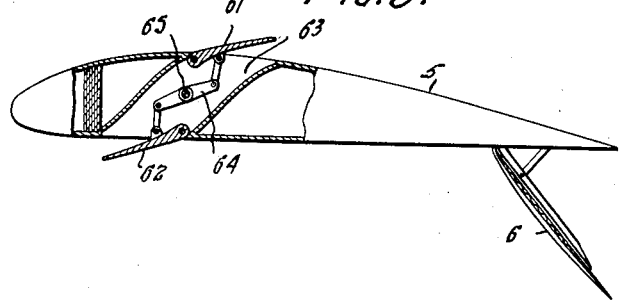
Fig. 8 is a diagrammatic view partly in cross section of a modification showing a bleeder arrangement in combination with a flap.

In Fig. 8 I have shown bleeders in combination with my flaps operating in the zone of optimum efficiency. Bleeders permit the air pressures at the upper and lower surfaces to equalize and spoil the lifting effect af a wing. Since the specified flap construction greatly decreases the air pressure on the upper surface and thus increases the lift of a wing, the bleeders, in combination with flaps, give a sensitivity of control which is far superior to the use of bleeders without the specified flap construction. The diagrammatic showing indicates pivoted bleeder members 61 and 62 pivoted in reverse relation in a slot 63. Operating arm 64 can be rotated by rotating operating shaft 65 and the bleeder members 61 and 62, through suitable linkage, either held flush with the wing surfaces or in extended position as illustrated. As in all forms, suitable mechanism for operating the controls on one side of the ship, while those on the other side remain inoperative, is provided.

Figure 9:
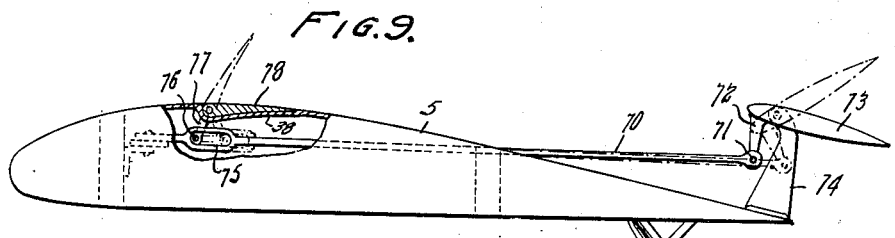
Fig. 9 is a diagrammatic view of a wing section partly in cross section of a modification showing a spoiler located on the upper surface of the wing at approximately the position of the maximum ordinate cooperating with an aileron located above the trailing edge in conjunction with a flap.

In Fig. 9 we have spoilers on the upper surface of the wing in combination with the specified flaps; the spoilers being in their movements correlated to the movement of ailerons placed on the upper trailing edge of the wing. Here the spoilers come into action only after the aileron has assumed the position where it is reaching its optimum effect. It is possible, of course, that the spoiler might be designed to assist the action of the aileron before it reached its optimum effect, where, for instance, a large yawing moment was desirable. At high angles of attack the flap is still operative, and the ailerons under such conditions are somewhat ineffective. The operation of the spoiler to supplement the ailerons is very useful in the combination shown, since the specified flap construction permits the operation of the plane at high angles of attack.

In Figure 9 there is provided a control rod 70 which is pivotally connected at 71 to a downwardly extending arm 72 of an aileron 73. The aileron 73 is pivotally mounted on a support 74 which is itself mounted at the trailing upward edge of the wing.

The rod 70 is provided with a lost motion slot 75 which is adapted to cooperate with lugs 76 through a linkage 77, not fully shown, to control the movement of a spoiler 78. The lost motion provided in operating rod 70 (the mechanism for operating which is conventional) permits the spoiler 78 to come into operative position and unnested from the upper wing surface only after the aileron 73 has performed its initial control functions. The exact point at which the spoiler comes into operation, as has been explained, can be determined by the factors which control the construction of the plane and which depend in part on the use to which the plane may be put, its construction, and so forth.

Figure 10:
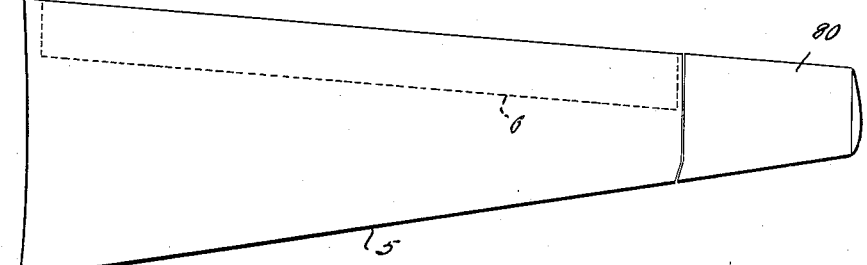
Fig. 10 is a top plan view of a modification showing a floating aileron in combination with a wing flap.
Figure 11:
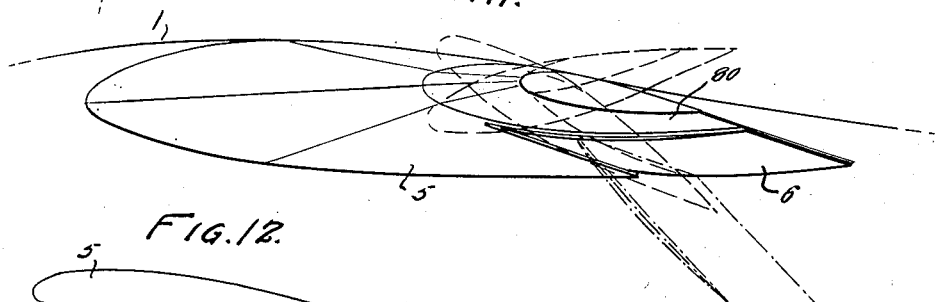
Fig. 11 is an end view of Fig. 10 showing in dotted lines the various positions of the floating aileron, and the effective position of the flap.

In Figures 10 and 11 with a floating aileron located as indicated at the wing tip, I have good aileron control even at very extreme angles of attack, such as are possible by use of the flap, since the aileron is not disturbed by the air streams passing over the wings. Thus I have, even in the extreme positions of the flap, an adequate and simple control through the aileron. In the previous methods of control, the moment of lateral control changes somewhat with the position of attack of the wings and the position of the flap, whereas with the floating aileron I have an independence of action which insures a maximum of safety. I have the same amount of lateral control regardless of the position of the flap or of the wing. In the form shown in Figures 10 and 11, by having the floating aileron at the wing tips, the forces exerted by the aileron on the ship are increased because of their location from the center of the wing spread, and at the slow speeds at which machines having the specified flap may be flown, this is a feature of considerable importance in achieving sensitive and dependable control.

In Figure 10 the floating aileron I have indicated by the numeral 80. The control for this floating aileron is conventional and is not shown. The various positions of the aileron and the operative position of the flap are indicated by dotted lines in Figure 11.

Figure 12:
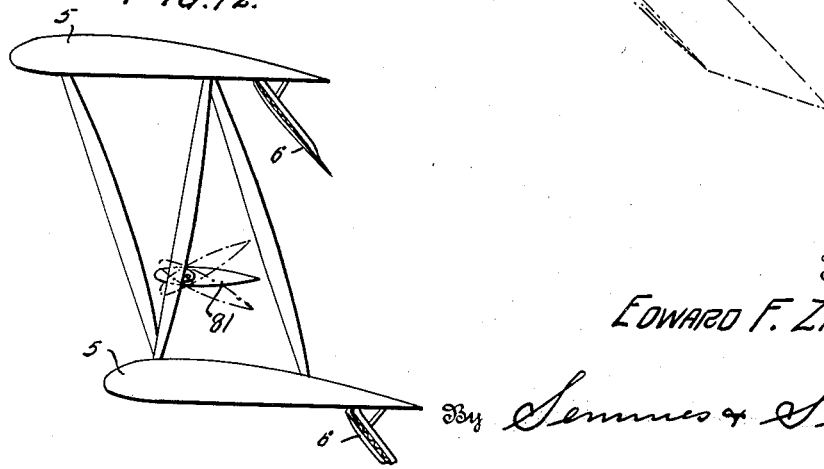
Fig. 12 is a diagrammatic view showing the wing flaps located on a biplane construction in which there is an aileron located between the wings.

In Figure 12 the ailerons shown are of the floating type, and each of the wings is provided with the specified flap. All of the advantages of the floating aileron in combination with the specified flap, as specified in Figures 10 and 11, exist except that the aileron is not located at the wing tips. One advantage inherent in this construction is that with the floating aileron at the point indicated, space is conserved for maneuvering, particularly on land. Additionally the entire length of the wing may be equipped with the specified flap so that maximum flap efficiency for a given wing spread can be obtained. On airplane carriers space conservation becomes important.

In Figure 12 the floating aileron which is located between the wings is indicated by numeral 81. Proper conventional controls for its operation may be provided.

Figure 13:
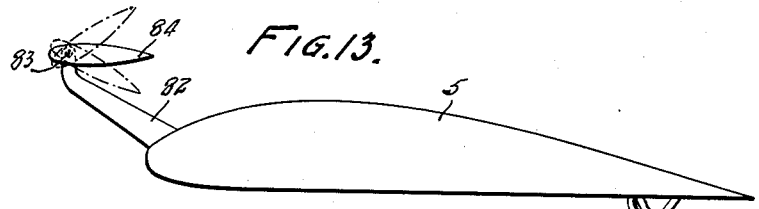
Fig. 13 is a diagrammatic view showing a wing section in which there is an aileron located in advance of the nose of a wing, in combination with a flap.

In Figure 13 I have a construction in which I have shown an airfoil section comprising an aileron in such relation to the nose that it can, in certain positions, operate somewhat similarly to the Handley Page slot, thereby increasing the lift of the wing at the same time the specified flap is accomplishing an increase in the lift, and by making the aileron movable, we can increase and decrease this effect. This combined increase in lift is very desirable under certain conditions of operation.

In Figure 13 the nose of the plane is provided with support members 82 upon which are pivoted at 83 the aileron members 84. The location of the aileron members 84 to the wing on which they are mounted is such that there can be a slotted wing effect in certain positions of the aileron which will tend to increase the lift, as has been explained.

Figure 14:
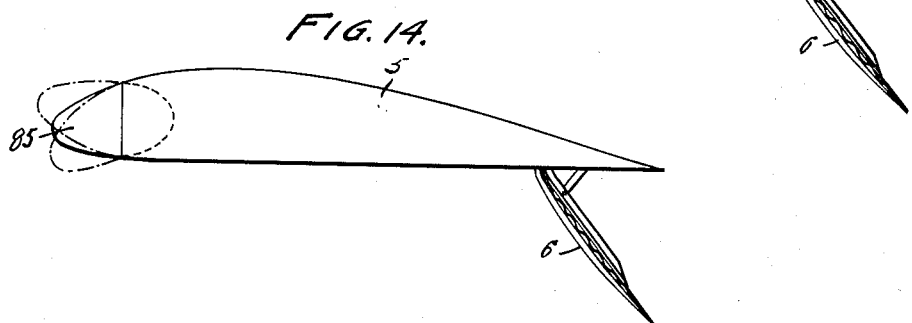
Fig. 14 is a diagrammatic illustration of a modification showing a wing flap with an adjustable wing nose to change the camber of the wing.

In Figure 14 I have shown means for changing the camber of the wing by using a movable nose of well known construction. When the nose is raised there is a tendency to destroy the lift of the upper wing, thereby giving a very sensitive control, since the specified flap increases the lift of the upper wing. When the nose is lowered, the flow of air over the upper wing is increased and the operation of the specified flap is augmented.

In Figure 14 the movable nose is indicated by the numeral 85. Means for moving this nose are well known in the art and the control mechanism and details of construction are not shown.

Figure 15:
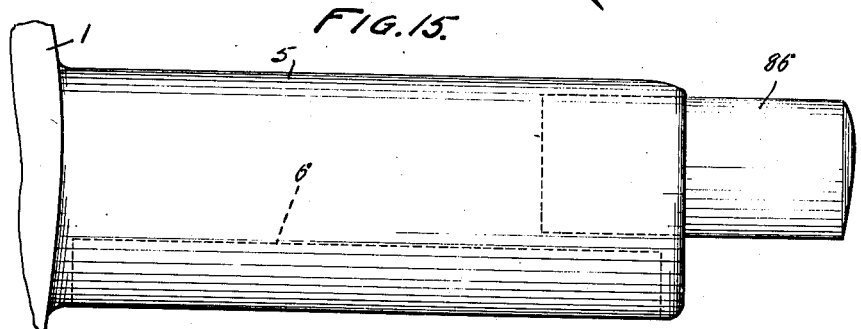
Fig. 15 is a top plan view of a modification showing an extensible wing tip with a wing flap.
Figure 16:
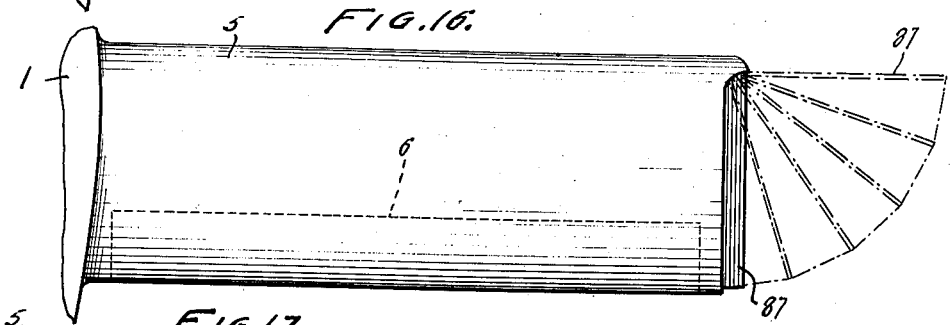
Fig. 16 is a top plan view of a modification showing a collapsible wing tip for increasing the effective wing area in combination with a flap.

In Figure 15 I have shown the combination of a flap with an extensible wing section. Since the flap and the extensible section both increase the lift, each of them supplements the other. At high speeds the wing section can be telescoped and the flap put in normal high speed flight position, thus permitting high speeds with low power. Figure 16 is similar to Figure 15, except the structure is a foldable extensible wing section.

In Figure 15 the extensible wing section is shown by the numeral 86, and in Figure 16 the foldable extensible wing section is indicated by the numeral 87. Constructional and control details are known in the art and are not here described.

Figure 17:
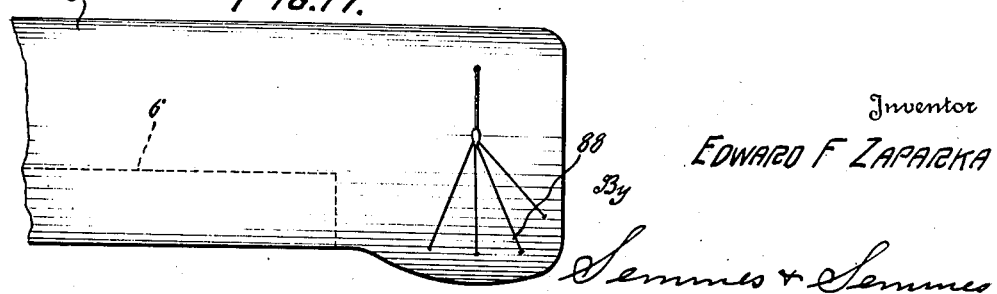
Fig. 17 is a fragmentary view showing diagrammatically an airplane wing having a wing flap and a warpable wing tip to change the camber of the wing.

In Figure 17 a warpable wing construction is shown, the warping being accomplished outside of the section of a wing to which is attached the specified flap. Advantages inherent in the wing tip aileron shown in Figures 10 and 11 are found in the form shown in Figure 17.

The warpable wing section and its operating mechanism, shown in part, is indicated generally by the numeral 88. The details of construction of the operating mechanism are known and it is thought unnecessary to describe them here.

While I have shown and described the preferred embodiments of my invention, I wish it to be understood that I do not confine myself to the precise details of construction herein set forth, by way of illustration, as it is apparent that many changes and variations may be made therein, by those skilled in the art, without departing from the spirt of the invention, or exceeding the scope of the appended claims. Though the use of the specified flap operating substantially within the zone of optimum efficiency is described in the specification, the prior art may not limit all aspects of the invention to combinations employing the specific flap.

I claim:

1. In an airplane, the combination of wings, wing flaps mounted on the wings, the trailing edges of said flaps in all operative positions lying substantially in the locus of perpendiculars to the datum lines for the wing sections at the trailing edge of the wing sections, with spoilers mounted on the wings at least in partial fore and aft alignment with the flaps to vary the effect of the corresponding flaps by modifying the airflow thereover.

2. In an airplane control construction, the combination of wings, ailerons for effecting a lateral control of the airplane, spoilers on the wings, and lost motion means linking the ailerons and the spoilers and so proportioned and arranged that the spoilers come into play only after the ailerons have reached their maximum point of efficiency.

3. In an airplane control construction, the combination of wings, flaps on the wings to increase the lift coefficient of the wings, ailerons for effecting a lateral control of the airplane, spoilers on the wings, and lost motion means linking the ailerons and the spoilers and so proportioned and arranged that the spoilers come into play only after the ailerons have reached their maximum point of efficiency.

4. In an airplane control construction, the combination of wings, flaps on the wings whose trailing edges in positions of extension are adapted to lie directly below the trailing edges of their respective wings, to increase the lift coefficient of the wings, ailerons for effecting a lateral control of the airplane, spoilers on the wings, and lost motion means linking the ailerons and spoilers and so proportioned and arranged that the spoilers come into play only after the ailerons have substantially reached their point of maximum rolling moment.

5. In an airplane control construction, the combination of wings, ailerons for effecting a lateral control of the airplane, spoilers on the wings, and lost motion means linking the ailerons and spoilers and so proportioned and arranged that the spoilers come into play only after additional rolling moment from aileron operation can no longer be expected.

6. In an airplane control construction, the combination of wings, flaps whose trailing edges lie within the locus of lines drawn through the trailing edges of the wings, and perpendicular to the datum lines of the wing sections, ailerons located near the trailing edges of the wings to effect lateral control of the airplane, spoilers on the wings at least in partial fore and aft alignment with the flaps, operative connections between the spoilers and the ailerons, and lost motion connections in said operative connections whereby the spoilers come into action only near the point of maximum application of the ailerons.

7. In an airplane, an airfoil construction comprising an upper surface, a lower surface, said surfaces arranged to produce in flight a reduction in pressure above the upper surface and an increase in pressure below the lower surface, an additional extensible member located to the rear of the center of the lower surface to increase pressure on the lower surface and reduce the turbulence on the rearward portion of the upper surface, means whereby said member is moved rearwardly and angularly with respect to said lower surface so that the trailing edge of said member travels in substantially a straight line from one position to another, a spoiler on the upper surface, an aileron to effect lateral control, in combination with a spoiler control means and an aileron control means, and lost motion linkages linking the motion of the spoiler and aileron controls so that the spoilers come into effect at the point the aileron commences to lose its effectiveness.

8. In an airplane, an airfoil construction comprising an upper surface, a lower surface, said surfaces arranged to produce in flight a reduction in pressure above the upper surface and an increase in pressure below the lower surface, a member adapted for movement substantially parallel to said lower surface, downwardly directed means pivotally connected to said member to increase the pressure on the lower surface and reduce the turbulence over the upper surface, means whereby the action of said last mentioned means is varied so that the trailing edge of said member travels substantially within the locus of lines perpendicular to the wing datum line and passing through the trailing edge of the wing, a spoiler on the upper surface, an aileron to effect lateral control, in combination with spoiler and aileron controls cooperating with each other to affect the flow around the wing to effect lateral control, said spoiler and said member overlapping laterally to effect at least partially the same airflow.

9. In an airplane, a composite airfoil comprising a plurality of members, means to change the relative position of said members and the angularity of one member with respect to the airfoil, whereby the extremity of one member moves in a substantially vertical plane with respect to the datum lines of the airfoil sections, a spoiler, an aileron, and linkage means so proportioned and arranged that the spoiler comes into effect only when the aileron approaches its angular limiting position for effective control.

10. In an airplane, the combination of a wing with a wing flap whose trailing edge in positions of extension and retraction is adapted to lie substantially directly below the trailing edge of the wing, an aileron, a spoiler, and control linkages between the aileron and spoiler so proportioned and arranged that the spoiler is brought into operation at the angular position of the aileron in which it is operating at its optimum efficiency.

11. In an airplane, the combination of a wing with a wing flap whose trailing edge is adapted to lie substantially within the locus of perpendiculars to the datum lines of the wing sections which pass through the trailing edge of the wing, an aileron, a spoiler, and control linkages between the aileron and spoiler so proportioned and arranged that the spoiler is brought into operation substantially at the angular position of the aileron in which it is operating at its optimum efficiency.

12. In an airplane, a wing, an extensible wing flap having a forward and a rear edge, means to cause the forward edge and the rear edge to have substantially a straight line movement during extension and retraction, a spoiler on the wing and laterally overlapping the extensible wing, an aileron, and control linkages between the aileron and spoiler so proportioned and arranged that the spoiler is brought into operation at the regular position of the aileron in which it is operating at its optimum efficiency.

13. In an airplane control construction, the combination of a wing, an aileron for effecting a lateral control of the airplane, a spoiler on the wing, and control linkages between the aileron and the spoiler so proportioned and arranged that the spoiler is brought into operation substantially only at the angular position of the aileron in which it is operating at its optimum efficiency.

14. An apparatus for controlling an airplane comprising wings, means for increasing the lift coefficient of the wings by substantially increasing the airflow over the upper surfaces of the wings while in motion, ailerons for lateral control, means for operating the ailerons, spoilers on the wings, spoiler controls and means linking the aileron controls and the spoilers so proportioned and arranged that the spoilers shall come into operation only near the point of ultimate efficiency of the aileron controls.

EDWARD F. ZAPARKA.